United States Patent

[11] 3,633,613

[72] Inventor Thomas M. Julow
 South Bend, Ind.
[21] Appl. No. 29,570
[22] Filed Apr. 17, 1970
[45] Patented Jan. 11, 1972
[73] Assignee The Bendix Corporation

[54] PRESSURE RELIEF MEANS FOR A CHECK VALVE
10 Claims, 3 Drawing Figs.

[52] U.S. Cl..................................... 137/512.3,
 137/512, 137/525.3
[51] Int. Cl............................................ F16k 15/14
[50] Field of Search............................................ 137/102,
 512, 512.3, 516.11, 516.13, 516.15, 516.17,
 516.19, 519.21, 516.23, 525, 525.1, 525.3; 303/4,
 31

[56] References Cited
UNITED STATES PATENTS
3,519,012 7/1970 Van Patten................... 137/102
3,059,637 10/1962 Senne.......................... 137/525 X
3,228,418 1/1966 Rosback et al. .............. 137/525 X
3,465,786 9/1969 Spisak ......................... 137/525.3 X
3,507,586 4/1970 Gronemeyer et al. ........ 137/525.3 X

*Primary Examiner*—Herbert F. Ross
*Assistant Examiner*—David J. Zobkiw
*Attorney*—Plante, Arens, Hartz, Smith, Thompson & Lee H. McCormick

ABSTRACT: A cap member in a vacuum-operated check valve for relieving backflow pressure received at the control chamber. The cap member has a head member surrounded by a plurality of openings in communication with the control chamber. A flexible plate retained on the head member is seated on the cap member over the openings to form a closed control chamber permitting the vacuum to operate a power brake system. The flexible plate is resilient enough to be unseated by back pressure of a predetermined value received in the control chamber. Thus, internal damage to the check valve is prevented.

PATENTED JAN 11 1972

3,633,613

INVENTOR.
THOMAS M. JULOW
BY
Plante, Arens, Hartz,
Smith & Thompson
ATTORNEYS

PRESSURE RELIEF MEANS FOR A CHECK VALVE

BACKGROUND OF THE INVENTION

This invention relates to an improved check valve for a vacuum-operated power brake system.

In vehicle engines equipped with smog control devices in accordance with the Federal Highway Safety Standards, under the hood temperatures have often risen high enough to cause plastic check valves to become pliable. For the smog control devices to operate efficiently, the engine must remain properly tuned at all times.

In an untuned engine, if the valves do not seat properly, fuel mixture is allowed to improperly enter the piston cylinder. This condition is not extremely noticeable until the driver attempts to restart the engine immediately after stopping it. Upon attempted restarting it is possible for the engine to backfire causing a high internal pressure at the manifold. Since the power brakes are operated by vacuum from the manifold, this backfire pressure enters its supply system and travels therein until it reaches the control chamber. A check valve is provided in the control chamber to seal the inlet port and prevent back pressure contamination of the power booster. Under such circumstances, it is possible that the pliable check valve will be ruptured by this internal back pressure causing the braking system to be without vacuum power assist.

In U.S. Pat. application Ser. No. 32,017 [BRS-70-20], filed Apr. 27, 1970, owned by the common assignee of this invention, rupturing of the vacuum supply line at the check valve has been prevented by welding a support member on a shoulder adjacent a cap retaining groove. The cap member is free to move in the groove to absorb back pressure yet retained in the groove by the support member. After the back pressure has subsided, the resilient shoulder biases the cap member into a sealing relationship with the check valve body.

SUMMARY OF THE INVENTION

In the present invention in order to overcome the possibility of rupturing the vacuum supply line connected to the power booster at the check valve, relief means have been attached to the closure member of the control chamber. The relief means is rigid enough to withstand the force of the vacuum on the closure member yet flexible enough to permit backflow pressure to escape from the control chamber without internally damaging the check valve.

It is, therefore, the principal object of this invention to provide a check valve which includes means for relieving internal back pressure caused by engine backfire.

It is another object of this invention to provide a closure member with flapper means for regulating pressure from a control chamber to the atmosphere.

It is a still further object of this invention to provide a braking system with a vacuum supply line having means to prevent rupture of the check valve from an engine backfire.

These and objects will be readily apparent to those skilled in the art from reading the specification and viewing the drawing.

DETAILED DESCRIPTION OF THE PREFERRED EMBODIMENT

Figure 1:
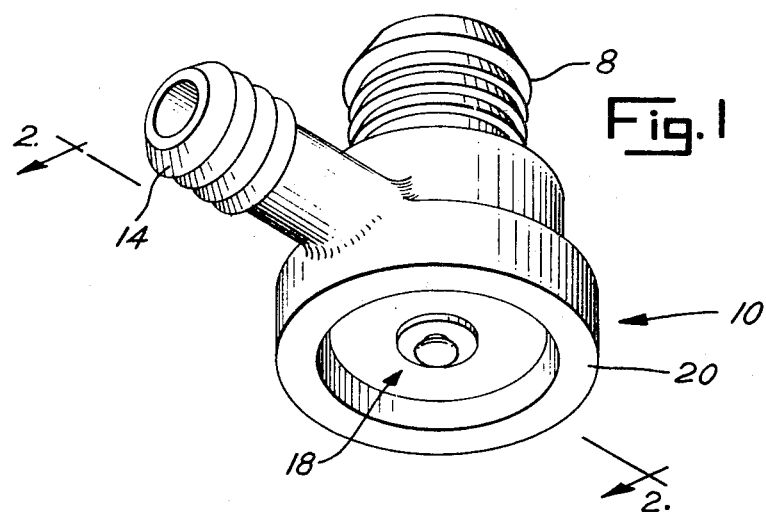
FIG. 1 is a perspective view of the check valve constructed in accordance with the principles of the present invention.
Figure 2:
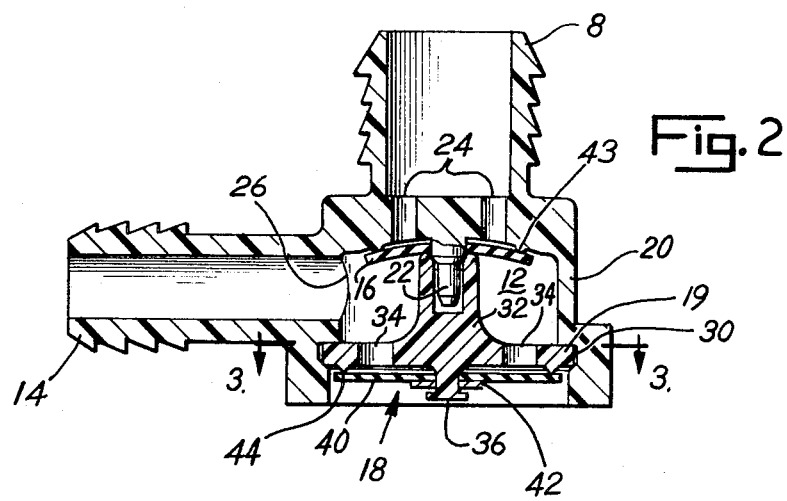
FIG. 2 is a cross-sectional view along line 2—2 of FIG. 1.

In the preferred embodiment of the check valve 10, shown in FIGS. 1 and 2, a control chamber 12 is connected to a system by conduit 8 and a source of vacuum by conduit 14. Valve means 16 permits fluid to flow from the system to the control chamber in response to vacuum at the engine manifold (not shown) but not in reverse. The back pressure received in the control chamber 12 caused by a backfire in the engine is released to the atmosphere by capping means 18. By relieving this internal back pressure through capping means 18, possible damage to the vacuum system of the power brake supply has been prevented.

The check valve 10 consists of body 20 having a control chamber 12 formed by valve means 16 and capping means 18. A stem 22 integrally formed with body 20 is surrounded by a plurality of openings 24 which provide inlet port means for a system to the control chamber 12, while conduit 14 connected to outlet port 26 provides the means to evacuate control chamber 12 of air by a source of vacuum. Valve means 16 is mounted on stem 22 to overlay the opening 24 in such a manner as to allow fluid to flow in only one direction.

Figure 3:
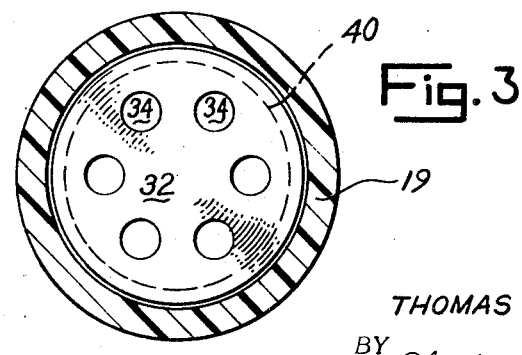
FIG. 3 is a cross-sectional view along line 3—3 of FIG. 2.

Capping means 18 has a body 19 with a plurality of openings or passages 34 (see FIG. 3) surrounding a tubular projection 32 and an axial projecting head member 36. Tubular projection 32 surrounds stem 22 for seating valve means 16 in a concave position when body 19 is retained in groove 30 of the housing 20 of the check valve 10. Flapper type flexible plate member 40 is retained on head member 36 by keeper member 42, which biases the flexible plate member 40 in a concave position against seat 44 of body 19.

MODE OF OPERATION OF THE PREFERRED EMBODIMENTS

With the engine of the vehicle running, vacuum will be produced at the manifold. Vacuum will draw air from a system by unseating valve means 16 while at the same time seating flexible plate member 40 against seat 44 thereby preventing atmospheric pressure from entering the control chamber 12. With the check valve 10 being an operatively closed unit, vacuum to operate the power booster (not shown) of the braking system is assured.

In the absence of vacuum being produced at the source when the engine is stopped, valve means 16 and flexible plate member 40 will be concavely seated on members 43 and 44 shown in FIG. 2.

Upon restarting the engine, if a backfire should occur, a high internal back pressure will be created at the manifold. Conduit 14 will carry this back pressure to control chamber 12. This back pressure will aid tubular projection 32 in seating valve means 16 and preventing this back pressure from reaching the power booster through conduit 8. However, back pressure above a predetermined value will pass through openings 34 unseating the flapper-type flexible plate member 40. The flapper-type flexible plate member 40 will regulate the escape of the back pressure to the atmosphere thereby preventing any internal damage to the check valve 10. When the back pressure subsides, keeper member 42 will again bias flexible plate 40 against seat 44 thereby providing a closed unit for vacuum-operating the power booster (not shown) which aids in applying the brakes of the vehicle.

I claim:

1. A check valve for a braking system operated by a source of vacuum with means for relieving high internal backflow pressure without internal damage to said valve, said means comprising:

a housing having a control chamber with an inlet port connected to a system and an outlet port connected to said source of vacuum;

a stem member on said housing extending into said control chamber;

a flexible member on said stem member, said flexible member overlying said inlet port;

capping means secured in said housing for seating said flexible member on said housing to prevent said backflow pressure from being communicated to said system through said inlet port, said capping means having an opening to said control chamber; and regulating means fixed on said capping means for relieving the fluid flow of back pressure through said opening.

2. In a check valve, as recited in claim 1, wherein said capping means includes:
a tubular projection surrounding said stem member for seating said flexible member in a concave position on said housing; and
a head member adjacent said opening for securing said regulating means to said capping means.

3. In a check valve, as recited in claim 2, wherein said regulating means includes:
a flapper member overlying said opening in said capping means; and
a keeper member attached to said head member for seating said flapper member on said capping means.

4. In a check valve, as recited in claim 3, wherein said flapper member is seated on said capping means and said flexible member is unseated from said housing when vacuum is available in the system.

5. In a check valve, as recited in claim 4, wherein said flexible member is seated while said flapper member is unseated by backflow pressure, thereby permitting said backflow pressure to escape into the atmosphere without damaging said system.

6. In a check valve housing with a flexible member in a control chamber for permitting fluid pressure flow in only one direction from a system to a source of vacuum, means for relieving backflow pressure received at said check valve housing to prevent damage to said system, said means comprising:
capping means secured in said check valve housing for positioning said flexible member, said capping means having an axial projection surrounded by a plurality of openings to said control chamber; and
flapper means fixed on said axial projection for regulating blackflow pressure through said plurality of openings to prevent damage to said system.

7. In a check valve, as recited in claim 6, wherein said flapper means includes:
a flexible plate surrounding said axial projection, said flexible plate overlying said plurality of openings; and
a keeper member fixed on said axial projection for seating said flexible plate in a concave position to form a closed unit which permits fluid to be evacuated from said system when vacuum is available while allowing backflow pressure of a predetermined value to unseat said flexible plate and escape into the atmosphere.

8. A check valve comprising:
a body having a control chamber therein with an inlet port connected to a system and an outlet port connected to a source of vacuum for removing air from said control chamber;
valve means in said control chamber;
cap means resiliently biased in an opening in said body, said cap means containing passages to said control chamber;
a tubular member extending from said cap means to said valve means, said tubular member positioning said valve means over the inlet port in said control chamber to only permit airflow from said system to said control chamber; and
flexible means covering said passages in said cap means to permit vacuum to evacuate said system air through said outlet port and to allow back pressure to be relieved from said control chamber through said passages without damage to said system.

9. A check valve, as recited in claim 8, wherein said cap means includes:
an axial projection for positioning said flexible member over said passages.

10. A check valve, as recited in claim 9, wherein said flexible means includes:
a flapper member attached to said axial projection; and
a keeper member for retaining said flapper member in a sealing relationship with said cap means to prevent flow through said openings.

* * * * *